United States Patent

[11] 3,598,362

| [72] | Inventor | Willis Allen Heidemann |
| --- | --- | --- |
| | | Wilcox, Nebr. 68982 |
| [21] | Appl. No. | 864,264 |
| [22] | Filed | Sept. 22, 1969 |
| [45] | Patented | Aug. 10, 1971 |
| | | Continuation-in-part of application Ser. No. 808,538, Mar. 19, 1969, now abandoned. |

[54] DIRECTIONAL CONTROL IRRIGATION VALVE
11 Claims, 10 Drawing Figs.

[52] U.S. Cl. ........................................................ 251/145
[51] Int. Cl. ........................................................ F16k 3/28
[50] Field of Search ........................................... 251/145;
61/12; 138/92; 239/212, 547, 550, 587, 589, 597, 598

[56] References Cited
UNITED STATES PATENTS

| 2,734,713 | 2/1956 | Webster | 251/145 |
| --- | --- | --- | --- |
| 2,918,251 | 12/1959 | Epp | 251/145 |
| 2,970,801 | 2/1961 | Lampert | 251/145 |
| 3,327,990 | 6/1967 | Hohnstein | 251/145 |
| 3,455,533 | 7/1969 | Epp | 251/145 |

Primary Examiner—William R. Cline
Attorney—Strauch, Nolan, Neale, Nies & Kurz

ABSTRACT: The invention relates to an improved, three-piece noncorrosive slide valve which may be assembled without tools in an opening cut in the sidewall of an irrigation pipe. The valve has an inner portion shaped to conform to the inside of the pipe, with a removable, replaceable gasket, and an outer portion shaped to conform to the outside of the pipe and a centrally located clamping member.

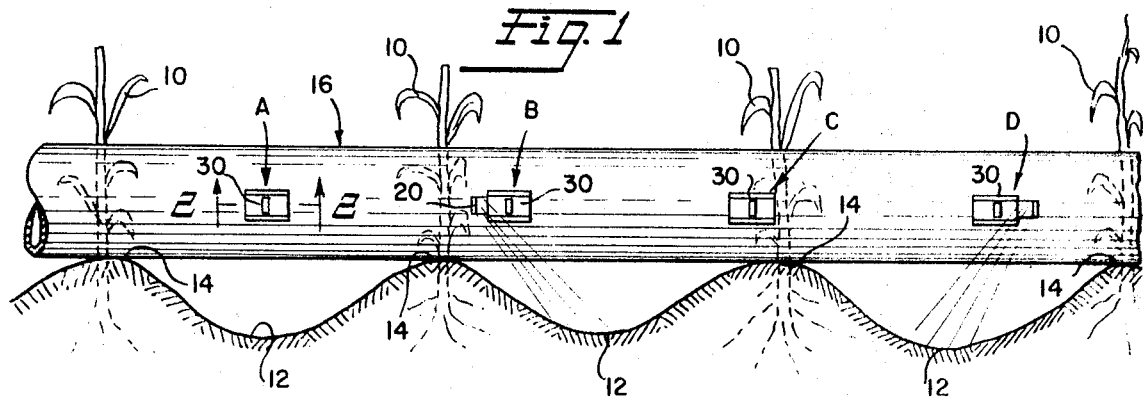
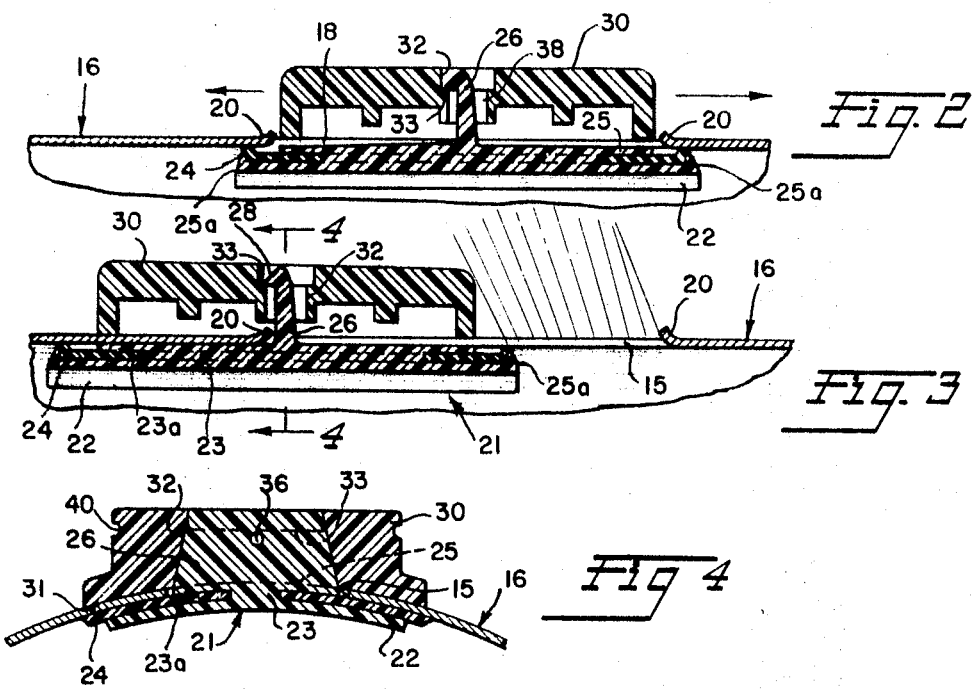
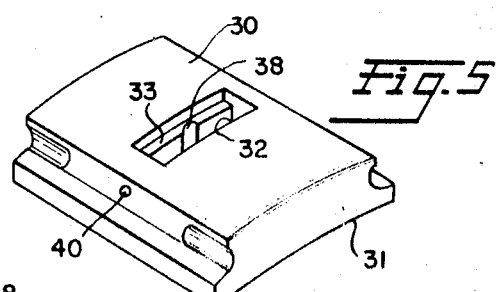
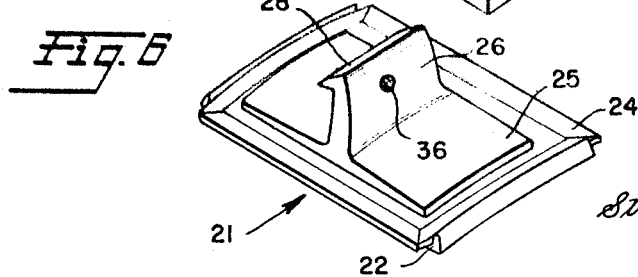
INVENTOR.
WILLIS ALLEN HEIDEMANN
BY
Strauch Nolan Neale Nies & Kurz
ATTORNEYS

INVENTOR

WILLIS ALLEN HEIDEMANN

DIRECTIONAL CONTROL IRRIGATION VALVE

CROSS REFERENCES TO RELATED APPLICATIONS

This application is a continuation-in-part of applicant's copending application Ser. No. 808,538, filed Mar. 19, 1969, and now abandoned.

BACKGROUND OF THE INVENTION

The present invention relates to a system of irrigation and more particularly to valves for controlling and directing irrigation water in a desired direction.

At the present time irrigation of fields by means of pipes has largely replaced open irrigation ditches because suitably valved pipes permit greater control and more efficient use of the irrigation water. Ordinarily, the irrigation water should be introduced between rows of plants.

Heretofore, irrigation has been accomplished by forming spaced openings in the side of the irrigation pipe when the pipe is purchased or installed. Irrigation may be controlled by a suitable valve at the inlet or the individual openings have sometimes been provided with a simple closure. This has been satisfactory when an irrigation pipe is first purchased or installed for the first irrigation setting because the openings are located to meet the spacing requirement of the particular crop for which the pipe is intended. However, when the pipe is removed from the field, e.g., at harvesttime, and placed in another field or in the same field at the beginning of the next planting season, certain problems have developed.

When crops are rotated, different crops require different spacings or, for various reasons, the same crop in successive years might be planted at a different angle to the irrigation pipe. Because of the changes in crops with different row spacings or the changes of angle of the crop rows to the irrigation pipe, openings in the pipe which are proper when the pipe is purchased may become improper when crop row spacing or angle is changed. Openings which would preferably be located midway between crop rows may be located adjacent to or even in alignment with a crop row so that for efficient irrigation it becomes necessary to guide the irrigation water emitted from a particular pipe opening or to close certain openings entirely.

I have found that the prior difficulties can be overcome and the flow from irrigation pipes controlled to direct irrigation water so that erosion to the soil and damage to the plants will be prevented and the water will be utilized an efficient manner.

Valves to permit such control must meet vary specific requirements. The valves must be simple and inexpensive in construction because a large number may be used in any given field. They must be easy and simple to install in existing pipe, must be capable of varying the location and direction of flow from which the water is emitted and must be capable of closing off the flow from pipe openings in locations where discharge would injure the plants on hills. The valves must also maintain their setting over long periods of time, for example, over an entire irrigation setting.

I have found that the difficulties and disadvantages of the prior art can be overcome and that a suitable valve can be provided which will meet all of the foregoing requirements.

SUMMARY OF THE INVENTION

One of the objects of the present invention is to provide a simple, inexpensive and effective valve for controlling and directing the flow of water from an irrigation pipe.

Another object is to provide a simple, effective valve for selectively closing an opening formed in the sidewall of a pipe or the like.

Another object is to provide a valve which may be assembled without tools.

Still another object is to provide a novel gate valve for closing an opening formed in the sidewall of a pipe, the valve being movable to either side of the opening to vary the location and direction of flow of water from the pipe. The valve and pipe include cooperating means which, when the valve is moved from an open toward a closed position, stop movement of the valve in the closed position and lock the valve in closed position to prevent accidental opening thereof in use or transit. This stop and lock feature is particularly useful in instances where, e.g., a farmer may not have enough pipe to completely irrigate the same field and may have to relocate the pipe in another section of the field. The valve of the invention insures that the position of the various valves is not disturbed during relocation of the pipe.

A further object resides in the provision of a novel gate valve for closing and opening the sidewall of a pipe, the valve including inner and outer body members resiliently secured together in sealing engagement with a pipe around the opening. In a preferred embodiment, the outer member includes a spring flange which engages a projection on the inner member to bias a resilient gasket on the inner member into sealing engagement around the opening internally of the pipe.

These and other objects and advantages reside in certain novel features of construction, arrangement, combinations and shaping of parts as will hereinafter be more fully set forth and described in the specification and pointed out in the appended claims.

BRIEF DESCRIPTION OF THE DRAWINGS

FIG. 1 is a fragmentary elevational view of an irrigation pipe spanning rows of plants and showing one embodiment of the two directional sliding irrigating valve of my present invention;

FIG. 2 is an enlarged fragmentary vertical sectional view, taken on the line 2–2 of FIG. 1, showing the valve in closed and locked position;

FIG. 3 is an enlarged fragmentary vertical sectional view, similar to FIG. 2, but showing the valve in one of the open positions;

FIG. 4 is a vertical transverse sectional view taken on the line 4–4 of FIG. 3;

FIG. 5 is an isometric view of the outside member of the valve of FIGS. 2—4;

FIG. 6 is an isometric view of the inside member of the valve of FIGS. 2—4;

DETAILED DESCRIPTION OF THE INVENTION

Figure 7:
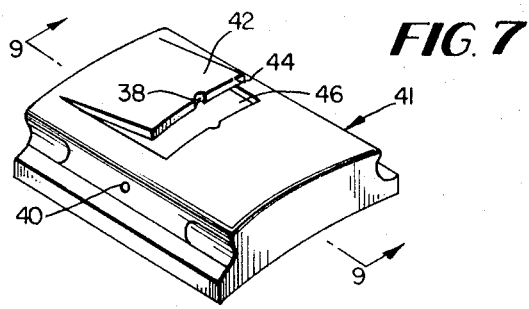
FIG. 7 is an isometric view of the outer body member of a preferred embodiment of the valve.
Figure 8:
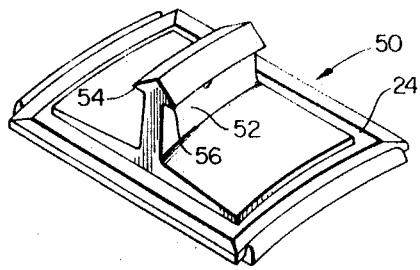
FIG. 8 is an isometric view of the inner body member of the preferred embodiment of the valve.
Figure 9:
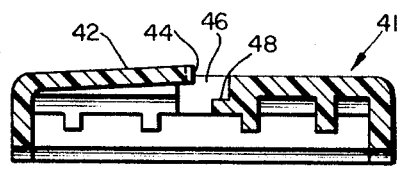
FIG. 9 is a longitudinal section view of the outer member taken along line 9–9 of FIG. 7.

FIG. 1 illustrates a pipe irrigation system in a field. The crops 10 are planted in rows with a furrow 12 between adjacent rows growing on hills or ridges 14. The irrigation pipe 16 is preferably light for easy handling and may be of thin aluminum or the like. The pipe extends transversely of the rows and rests on the top of the hills or ridges 14. Openings 15, formed in a sidewall of the pipe 16, are indicated at locations A, B, C. and D to permit the irrigation water to flow out between the rows.

The ideal position for each opening is midway between the crop rows and directly in alignment with the furrow as indicated at position A, and this ideal spacing of the openings on the pipe can be provided when the pipe is manufactured.

When an irrigation pipe 16 is installed for crops to be planted in rows 30 inches apart, for example, the spacing between positions A, B, C, and D would also be 30 inches and the openings positioned midway between crop rows as indicated at position A. If later, the crop is changed so as to require a spacing of 40 inches between rows 14 or if the rows are no longer perpendicular to the pipe, positions B, C, and D are no longer midway between the crop rows nor are the openings aligned with the furrows between rows. It is therefore necessary to direct the flow of water emitted from openings at positions B and D so that the water will flow along the furrow and to close the opening at position C entirely so that the flow of water will not injure the plants in the crop row aligned with the opening in position C.

One embodiment of a valve for providing the necessary directional flow control is illustrated in FIGURES 2—6.

A rectangular opening 15 is cut or otherwise formed in the pipe 16 with the long sides 18 parallel to the axis of the pipe. The horizontal sides 18 of the opening are straight and parallel to the pipe axis and the ends of each opening are turned outwardly at an acute angle to form a lip as indicated in 20 in FIGS. 2 and 3. Each of lips 20 functions as a gasket guard, directs the flow of water from pipe 16, and acts to stop and lock the gate valve in closed position as described below.

The valve comprises an integral inner body member 21 molded from plastic, rubber, or any other suitable noncorrosive material. Body 21 comprises a lower plate 22 which is shaped to conform with the inside of pipe 16 as illustrated in FIG. 4 and is longer and wider than the opening in the pipe, an upper secondary plate 25 conforming substantially in size to the size of the opening, and an elongated intermediate section 23 integrally connecting plates 22 and 25 and having an annular recess 23a formed therearound between plates 22 and 25.

A removable, replaceable resilient sealing gasket member 24 of such material as neoprene rubber or plastisol having a generally rectangular central opening is tightly received around section 23 in annular recess 23a and forms a liquid sealing surface against the interior or pipe 16 around opening 15 when the valve is assembled in closed position.

As seen in FIGS. 3 and 4, the width of plate 22 is less than the effective width of gasket 24 while its length is greater and terminates in end flanges 25a, the outer surface of each of which is sloped at an angle toward the center of the valve to provide a flow direction surface parallel to the cooperating surface of adjacent pipe lip 20. In this manner, when the Valve is in an open position, the adjacent flanges 25a and lip 20 cooperate to properly direct the flow of water from pipe 16.

Body 21 has an integral latching projection or hook 26 which extends through pipe opening 15 and engages the flat sides of the opening as shown in FIG. 4. The outer end of the hook member 26 has a projecting lip or ridge 28 on its forward or rearward face or both.

The valve is completed by a generally rectangular cover member 30, the lower surface 31 of which is curved to conform to the outer surface of the pipe 16 as indicated in FIG. 4.

The cover member 30 is provided with a central transverse slot 32 through which the projection 26 extends and adjacent the outer surface of the cover member, the slot is provided with inwardly projecting shoulders 33 for engagement with the lip or lips 28 of the member 26 as shown in FIG. 3.

In applying the valve of the present invention to an irrigation pipe, the spaced rectangular openings are formed in the sidewall of the pipe. This can be done after the irrigation pipe is placed in the field, or the pipe may be supplied with suitable spaced openings.

The inner assembly of the valve consisting of the body 21 and gasket portion 24, is inserted through the opening in the pipe and the convex cylindrical surface of the inner portion of the valve mates with the cylindrical inner wall of the pipe to align the inner member with the pipe.

In order to facilitate assembly the projection member 26 may be provided with an opening 36 to receive a wire or cord. This wire or cord may be then passed through the slot 32 in the cover or outer member 30 so that the inner member and hook projection 26 are held firmly against the inner wall of the pipe while the cover member is being pressed over the hook projection until the lip or lips 28 engage the shoulder or shoulders 33. Grooves 38 may be placed to the front and rear walls of the slot 32 and easy passage of the wire or cord. The grooves 38 also permit the projection 26 to be assembled on either side of slot 32.

A bore 40 may be provided on each side of member 30 to facilitate attachment of a wire clip and flow directional sock if such is needed.

The projection 26 extends through the opening in the sidewall and the sides of this projection 26 engage the straight longitudinal sidewalls of the opening to position the inner member as shown in FIG. 4. The cover or outer member 30 is then attached to the inner assembly so that the projection 26 extends through the slot 32 until the lip or lips 28 of the projection 26 engage the shoulder or shoulders 33 locking the outer and inner members together. The tapered sidewalls of the projection 26 and slot 32 position the outer member radially, the projection itself positions the outer member longitudinally and the cylindrical surface of the outer member mates with the cylindrical outer surface of the pipe to further assure proper positioning of the outer member.

As seen in FIG. 2, the assembled valve is normally locked in closed position by pipe lips 20 which engage the end faces of outer member 30. In this manner, the valve is prevented from accidentally opening during use of transit of the pipe. Also, in moving the valve from an open to closed position the leading end face of member 30 will abut against lip 20 to stop the valve in closed position.

The valve may be opened in either direction as shown in FIG. 2 by raising the appropriate end portion of member 30 over lip 20 and sliding the valve in the respective direction. The limited raising of member 30 is permitted by the resiliency of gasket 24. Sliding the valve from one extreme end position to the other results in spacing of the opening through which irrigation water may be emitted and also in the direction in which the irrigation water flows from the opening. In location B, the valve is opened toward the right so that irrigation water is emitted from the left-hand portion of the pipe opening and directed toward the center of the furrow. In location C, the valve is closed because any water emitted from it would impinge directly upon plants growing in the row in alignment with the valve and in location D the valve is opened toward the left so that again the water is directed toward the center of the furrow.

The maximum degree of opening of the valve in either direction occurs when projection 26 engages a lip 20 as shown in FIG. 3. In actual usage, however, the valve is normally opened about one-fourth to three-eighth inch, although the maximum opening corresponding to that of FIG. 3 is about 1 inch.

Referring now to FIGS. 7—10, the preferred embodiment of the valve of my invention is illustrated and is identical in many respects to the embodiment illustrated in FIGS. 2—6, with like parts being identified by like numerals. However, outer member 41 of this preferred embodiment has a portion of its top wall cut out to form a resilient spring flange plate or tongue 42, the free inner abutment edge 44 of which defines one side of a central transverse hook-receiving slot 46. An integral inwardly projecting shoulder 48 is formed along the other side of the slot.

Inner member 50 is identical to member 21 of FIG. 6, except that the outer end of projection or hook 52 has oppositely projecting horizontal lips or ridges 54 and 56.

Figure 10:
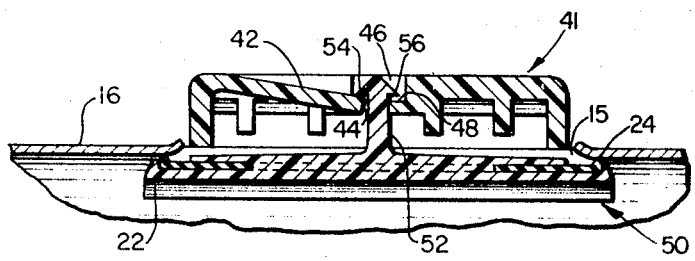
FIG. 10 is a longitudinal section view similar to FIG. 2 and illustrating the preferred valve embodiment assembled in the closed position around the opening of a pipe.

As shown in FIG. 10, when the valve is assembled on a pipeline 16, flange 42 is bent inwardly so that its inner edge 44 engages underlip 54 to resiliently urge member 41 and 50 toward each other and bias the sealing gasket 24 into sealing engagement with the interior of the pipe wall portions surrounding opening 15. It should be noted that the other lip 56 normally does not engage shoulder 48, but is spaced therefrom due to the outward biasing force of flange 42 acting against lip 54.

The embodiment of FIGS. 7—10 is especially advantageous in maintaining a seal around the pipe opening and preventing leakage even after long periods of usage of the valve. Thus, even though the resilient gasket 24 may become somewhat fatigued and partially collapse after extensive usage, the biasing force in spring flange 42 urges inner member 50 toward the pipe and holds the gasket in sealing engagement around the pipe opening.

This embodiment is also highly advantageous in preventing collapse of the thin-walled irrigation pipes when the water source is a deep well and the well pump is suddenly turned off. In some irrigation systems, well water may be pumped and raised 150 to 200 feet for distribution to the irrigation pipes. If the pump should suddenly be stopped, the head of water will rapidly drop down the 150-foot shaft to the underground water level and will create a suction in the pipes which could cause them to collapse. The valve shown in FIGS. 7—10 prevents such an occurrence. Suction inside the pipe will cause inner member 50 to be pulled inwardly against the bias of spring flange 42 a sufficient distance equal to the normal spacing between lip 56 and shoulder 48 to unseat gasket 24 and permit ambient air to enter the pipe through opening 15, thereby equalizing the pressures inside and outside the pipe.

It is apparent from the foregoing that I am able to attain the objects of my invention and provide a simple, inexpensive effective valve which may be assembled in an opening in an irrigation pipe without the need of tools. The valve may be advantageously opened in either direction along the pipe to vary the location and the direction of flow from which water is emitted from the pipe. Accidental opening of the valve is prevented by the described cooperating elements on the valve and pipe which function to normally stop and lock the valve in a closed position.

I claim:

1. A control valve for an irrigation pipe having an opening in the sidewall thereof with said valve being movable longitudinally along said pipe across said opening, said valve comprising an inner member having a surface generally conforming to and engaging the interior of the pipe and being larger than the opening in the pipe, said inner member having projection means extending outwardly therefrom through said opening, said projection means being generally centrally located longitudinally along said inner member, an outer member having a surface generally conforming to the exterior of said pipe and having a generally centrally located opening therein to receive said projection means, said projection means having means for securing said inner and outer members together such that said inner and out members are substantially unobstructed for valve-opening sliding movement across said pipe opening in either direction longitudinally along said pipe so that fluid may be selectively emitted from either end of said pipe opening adjacent either end of said inner member.

2. A control valve as defined in claim 1, said inner member comprising spaced upper and lower plates and removable resilient sealing means positioned therebetween and sealingly engaging the pipe around said pipe opening.

3. A control valve as defined in claim 2, said lower plate having end faces extending beyond said sealing means, said end faces being angled to direct water toward the valve.

4. A valve as defined in claim 1, in which said projection means is provided with an opening adjacent the outer end thereof for receiving cord or wire, and the transverse sidewall of the opening in the outer member are provided with grooves in alignment with said opening in said projection means.

5. A control valve as defined in claim 1, said outer member having compressible resilient means adjacent one side of said opening in said outer member, said projection means having a lip at its outer end to be engaged by said resilient means which, when compressed, provides a biasing force which urges said inner member against the interior of said pipe.

6. A control valve as defined in claim 5, said outer member having a shoulder adjacent the other side of said opening in said outer member, said projection means having another lip at its outer end normally spaced from said shoulder, but adapted to engage said shoulder when said inner member is forced away from said outer member against the bias of said resilient means.

7. A control valve as defined in claim 5, said compressible resilient means comprising a spring plate member connected at one end to said outer member and having its other abutment end located adjacent said one side of said opening in said outer member for engaging under the lip of said projection means and thereby urge said inner member against the interior of said pipe when said valve is in assembled relationship on said pipe.

8. An irrigation control assembly comprising a pipe having an opening in the sidewall thereof, the pipe wall section defining the ends of the pipe opening being bent outwardly, a valve movable longitudinally along said pipe across said opening, said valve comprising an inner member having a resilient surface generally conforming to and engaging the interior of said pipe and being larger than the opening in said pipe, said inner member having projection means extending outwardly therefrom through said pipe opening, said projection means being generally centrally located longitudinally along said inner member, an outer member having a surface generally conforming to the exterior of said pipe and having a generally centrally located opening therein to receive said projection means, said projection means securing said inner and outer members together and said inner and outer members being substantially unobstructed for sliding movement across said pipe opening in either direction longitudinally along said pipe; and said outwardly bent pipe wall sections adapted to engage said outer member to stop and lock said valve in a closed position and prevent accidental opening thereof.

9. An irrigation control assembly as defined in claim 8, said inner member comprising a plate and resilient sealing means connected thereon to sealingly engage said pipe around said pipe opening, said plate having end faces extending beyond said sealing means, said end faces being angled to cooperate with said bent pipe wall sections to direct water from said pipe opening toward said valve.

10. An irrigation control assembly as defined in claim 9, said outer member having compressible resilient means adjacent one side of said opening in said outer member, said projection means having a lip at its outer end to be engaged by said resilient means which, when compressed, provides a biasing force which urges said inner member against the interior of said pipe.

11. An irrigation control assembly as defined in claim 10, said outer member having a shoulder adjacent the other side of said opening in said outer member, said projection means having another lip at its outer end normally spaced from said shoulder, but adapted to engage said shoulder when said inner member is forced away from said outer member against the bias of said resilient means.